Patented Oct. 13, 1953

2,655,532

UNITED STATES PATENT OFFICE 2,655,532

N-OXOALKYL-PARA-AMINOSALICYLIC ACIDS

Heinrich Hopff and Hermann Spaenig, Ludwigshafen (Rhine), Germany

No Drawing. Application June 23, 1951, Serial No. 233,240. In Germany August 1, 1950

3 Claims. (Cl. 260—519)

The present invention relates to N-oxoalkyl-para-aminosalicylic acids, in particular to N-γ-oxobutyl-para-aminosalicylic acid, and a process for manufacturing such acids.

We have found that N-oxoalkyl-para-aminosalicylic acids, in particular N-γ-oxobutyl-para-aminosalicylic acid, have a markedly enhanced bacteriostatic effect on tubercle bacilli as compared to unsubstituted para-aminosalicylic acid and its salts.

To prepare N-oxoalkyl-para-aminosalicylic acids we may use various methods. For example, we may cause a suitable α.β-unsaturated ketone, e. g. vinylmethyl ketone, or a saturated β-halogeno ketone, e. g. chloro- or bromo-ethyl-methyl ketone, to act on para-aminosalicylic acid or a soluble salt thereof, preferably in water, alcohols or other inert solvents. Depending on the proportions in which the starting materials are used one or two radicles of the ketone may enter the amino group of the para-aminosalicylic acid. Thus we may obtain N-γ-oxobutyl-para-aminosalicylic acid by the reaction between equimolecular proportions of vinylmethyl ketone and para-aminosalicylic acid. If, however, we allow an excess of vinylmethyl ketone to act on para-aminosalicylic acid, we may also, or exclusively, obtain N.N-di-γ-oxobutyl-para-aminosalicylic acid. When using a β-halogenated saturated ketone instead of the vinyl ketone, the same result may be achieved. In this case it is preferred to carry out the reaction in the presence of an agent capable of binding the hydrogen halide set free in the introduction of the ketone radicle. The nature of this agent is not critical. We have found that pyridine or sodium carbonate or bicarbonate are most suitable.

We may also introduce the ketone radicle into the para-aminosalicylic acid by adding water under the influence of acid mercuric salts to the triple linkage in N-3-butinyl-para-aminosalicylic acids or their salts. It may be even more convenient to combine this catalytic addition of water with the introduction of the butinyl group into the para-aminosalicylic acid. We may so, for example, treat para-aminosalicylic acid with vinyl acetylene in the presence of water, preferably in the presence of an organic solvent miscible with water, and in the presence of an acid mercuric salt, such as mercuric sulfate, and we obtain in one reaction N-γ-oxobutyl-para-aminosalicylic acid or the N.N-di-γ-oxobutyl-para-aminosalicylic acid.

The N-oxoalkyl-para-aminosalicylic acids and their salts are well-defined crystallized compounds. It is very simple to convert the salts into the free acids and vice versa. The free acids are difficultly soluble in water. The alkali metal and alkali earth metal salts are more water-soluble. It is, therefore, preferable to use these salts in the practical application of the new para-aminosalicylic acid derivative.

The following examples will further illustrate how our invention may be carried out in practice, but they are in no way restricting our invention. The parts are by weight.

Example 1

To a solution of 38 parts of para-aminosalicylic acid in 100 parts of ethanol 40 parts of vinylmethyl ketone are slowly added at 60° to 65° C. The whole is stirred for 3 hours at this temperature and the ethanol removed by distillation. N-γ-oxobutyl-para-aminosalicylic acid is obtained as a yellowish solid. By recrystallisation from methanol the pure acid is obtained in the form of colorless crystals melting from 164° to 165° C.

The same product is obtained when working as follows. To a solution of 53 parts of the sodium salt of para-aminosalicylic acid in 100 parts of ethanol 40 parts of vinylmethyl ketone are added at 65° C. A solid product is obtained which is filtered off, dissolved in water and acidified with formic acid. Free N-γ-oxobutyl-para-aminosalicylic acid is obtained, having the same properties as the product described in the first paragraph.

Example 2

A solution of 30 parts of para-aminosalicylic acid in 100 parts of 70 per cent ethanol is admixed with 10 parts of concentrated sulfuric acid and 10 parts of mercuric sulfate. 30 parts of vinyl acetylene are then introduced slowly at 60° C. The whole is stirred for 3 hours at that temperature and the methanol removed by distillation. Crude N-γ-oxobutyl-para-aminosalicylic acid is obtained as a yellowish solid. It is recrystallized from methanol yielding a product identical with that described in the preceding example.

We claim:

1. The para-aminosalicylic acid derivative corresponding to the formula

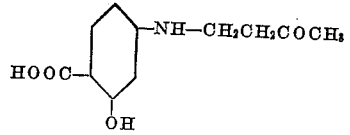

2. The para-aminosalicylic acid derivative corresponding to the formula

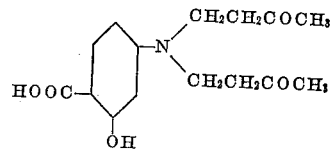

3. Para-amino salicylic acid derivatives of the group consisting of N-(gamma-oxo-butyl)-para-amino salicylic acid and N-di-(gamma-oxo-butyl)-para-amino salicylic acid.

HEINRICH HOPFF.
HERMANN SPAENIG.

No references cited.